United States Patent
He et al.

(10) Patent No.: US 7,739,475 B2
(45) Date of Patent: Jun. 15, 2010

(54) SYSTEM AND METHOD FOR UPDATING DIRTY DATA OF DESIGNATED RAW DEVICE

(75) Inventors: Lei He, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 456 days.

(21) Appl. No.: 11/923,461

(22) Filed: Oct. 24, 2007

(65) Prior Publication Data

US 2009/0113130 A1 Apr. 30, 2009

(51) Int. Cl.
*G06F 9/26* (2006.01)
(52) U.S. Cl. ...................................... 711/203
(58) Field of Classification Search ........................ None
See application file for complete search history.

(56) References Cited

U.S. PATENT DOCUMENTS 5,938,743 A * 8/1999 Nahidipour et al. ............ 710/22
6,665,297 B1 * 12/2003 Hariguchi et al. ............ 370/392

* cited by examiner

*Primary Examiner*—Tuan V Thai
*Assistant Examiner*—Duc T Doan
(74) *Attorney, Agent, or Firm*—Workman Nydegger

(57) ABSTRACT

A system and method for updating dirty data of designated raw device is applied in Linux system. A format of a command parameter for updating the dirty data of the designated raw device is determined, to obtain the command parameter with the correct format and transmit it into the Kernel of the Linux system. Then, a data structure of the designated raw device is sought based on the command parameter, to obtain a fast search tree of the designated raw device. Finally, all dirty data pages of the designated raw device are found by the fast search tree, and then are updated into a magnetic disk in a synchronous or asynchronous manner. Therefore, the dirty data of an individual raw device can be updated and written into the magnetic disk without interrupting the normal operation of the system, hereby ensuring secure, convenient, and highly efficient update of the dirty data.

8 Claims, 2 Drawing Sheets

SYSTEM AND METHOD FOR UPDATING DIRTY DATA OF DESIGNATED RAW DEVICE

BACKGROUND

1. Field of Invention

The invention relates to a method for updating dirty data of a designated block device, and in particular to a system and method for updating dirty data of a designated raw device that is not based on a file system.

2. Related Art

In order to expedite magnetic disk input/output speed of the upper level application programs processed by Kernel, the Kernel of a Linux system tries its utmost in buffering the disk data accessed during system operation into a memory. When the memory is busy, the Kernel synchronously buffers the stored data into a magnetic disk and releases a part of space of the buffered memory according to a specific rule. Thus, when a user intends to read data from the magnetic disk, and in case that the Kernel checks and finds that the required data is presently stored in the buffer memory, then it reads the required data from the buffer memory immediately; otherwise, it reads the required data from the magnetic disk. Meanwhile, when a user intends to write data into the magnetic disk, the Kernel first stores the data into the buffer memory, as such, the write request of the user can be successfully accomplished immediately.

In the above-mentioned method for delaying writing data into the magnetic disk, a plurality of requests of writing data into adjacent areas of the magnetic disk can be gathered up to be executed in a single write action, hereby reducing frequency of movements of magnetic head and raising the efficiency of writing the data into the magnetic disk. However, this kind of mechanism usually would result in the discrepancy between data buffered in the memory and the data stored in the magnetic disk. Such data in the buffered memory not identical to that stored in the magnetic disk is referred to as dirty data.

In general, Kernel manages the buffer-stored data in a memory page manner, for example, in a block device of the raw device not based on a file system, each of the opened block devices, such as the magnetic disk, partitions, LVN logic volume, etc., all having a fast speed search number used to index all the buffer-stored data pages, wherein the memory page of which data is not identical to that of the magnetic disk is referred to as a dirty page. In case a power outage occurs and there are too many dirty data pages, then part of the buffer-stored data may be lost for being not be able to be written into the magnetic disk in time.

In order to reduce the risk of losing the buffer-stored data mentioned above, in the prior art, the Kernel would search dirty data, that have not been updated for a long time, in the buffer memory of all the opened block devices at regular time intervals or when the memory occupied by the buffer-stored data becomes too large, and then write the searched dirty data into the magnetic disk, thus ensuring that important data would not be lost due to the above-mentioned buffer-storing mechanism.

Though in the prior art, the Kernel would write the dirty data synchronously into the magnetic disk at regular time intervals or when the memory occupied by buffer-stored data is getting too large, yet in order to raise the memory utilization rate to its utmost extent, in practical application, the Kernel would buffer quite a lot of dirty data to be written in the buffer memory. Usually, these dirty data belong respectively to a plurality of opened block devices. In case that the user intends to write the dirty data of a block device which he deems important into the magnetic disk immediately, then this can be achieved by merely closing this block device, or by writing the dirty data of all the block devices synchronously into the magnetic disk through a forced update order. However, this kind of approach not only wastes time, but also delays the crucial moment for user to preserve and save important data. As such, when the percentage of dirty data of user designated block device occupied in the buffer memory is relatively small, the above-mentioned problem would become more evident and pronounced.

SUMMARY

In view of the above-mentioned drawbacks and shortcomings of the prior art, the objective of the invention is to provide a system and method for updating dirty data of designated raw device, which is quite different from the device dirty data processing of the of Kernel in prior art, and allows a user to update the buffer-stored dirty data of a certain raw device into a magnetic disk at any time without turning off the related device.

The invention provides a system for updating dirty data of designated raw device, which resides in a Linux system, including: a determination module, a transmission module, a seeking module, a search tree module, and an update module. The determination module is used to obtain a device number of a designated raw device in a user configuration based on a device route of an command parameter for updating dirty data of a designated raw device, and determine the format of a command parameter according to whether the device number is obtained. When the device number is obtained, the determination module determines that the format of command parameter is correct. The transmission module is used to transmit command parameter to a Kernel of the Linux system in a system call manner when the format of command parameter is correct. The seeking module is used to seek a data structure of the designated raw device according to the device number of the command parameter. The search tree module is used to get a fast search tree of the designated raw device through mapping an address of the sought data structure, and find all dirty data pages of the designated raw device by the got fast search tree. The update module is used to update all dirty data pages to a magnetic disk in a synchronous or asynchronous manner.

In addition, the invention provides a method for updating dirty data of designated raw device, applied in a Linux system, including: (a) determining if a format of a command parameter for updating the dirty data of the designated raw device is correct; (b) when the format is correct, accessing a Kernel of a Linux system; (c) seeking a data structure of the designated raw device according to the command parameter; (d) obtaining a fast search tree of the designated raw device through mapping an address of the sought data structure; (e) finding all dirty data pages of the designated raw device by the fast search tree; and (f) updating the dirty data pages to a magnetic disk in a synchronous or asynchronous manner.

In an embodiment, the designated raw device is obtained through the format of the command parameter for updating the dirty data of the designated raw device, where the command parameter is transmitted into the Kernel, and then the designated raw device is compared with a raw device in a raw device data structure chain table, hereby obtaining a matched designated raw device. All dirty data pages of this designated raw device are obtained by the fast search tree. Thus, a user may update the buffer-stored dirty data of the designated raw device to the magnetic disk in a synchronous or asynchronous manner without turning off the related device. Therefore, not only the time for processing the update of the dirty data according to the invention can be relatively shortened, but also the important data can be timely stored under application of the invention.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given herein below and that is for illustration only, and thus are not limitative of the present invention, and wherein.

DETAILED DESCRIPTION

The purpose, construction, features, and functions of the invention can be appreciated and understood more thoroughly through the following detailed description with reference to the attached drawings.

In the following, the characteristics and implementation of the invention will be described in detail through preferred embodiments together with the accompanying drawings.

Figure 1:
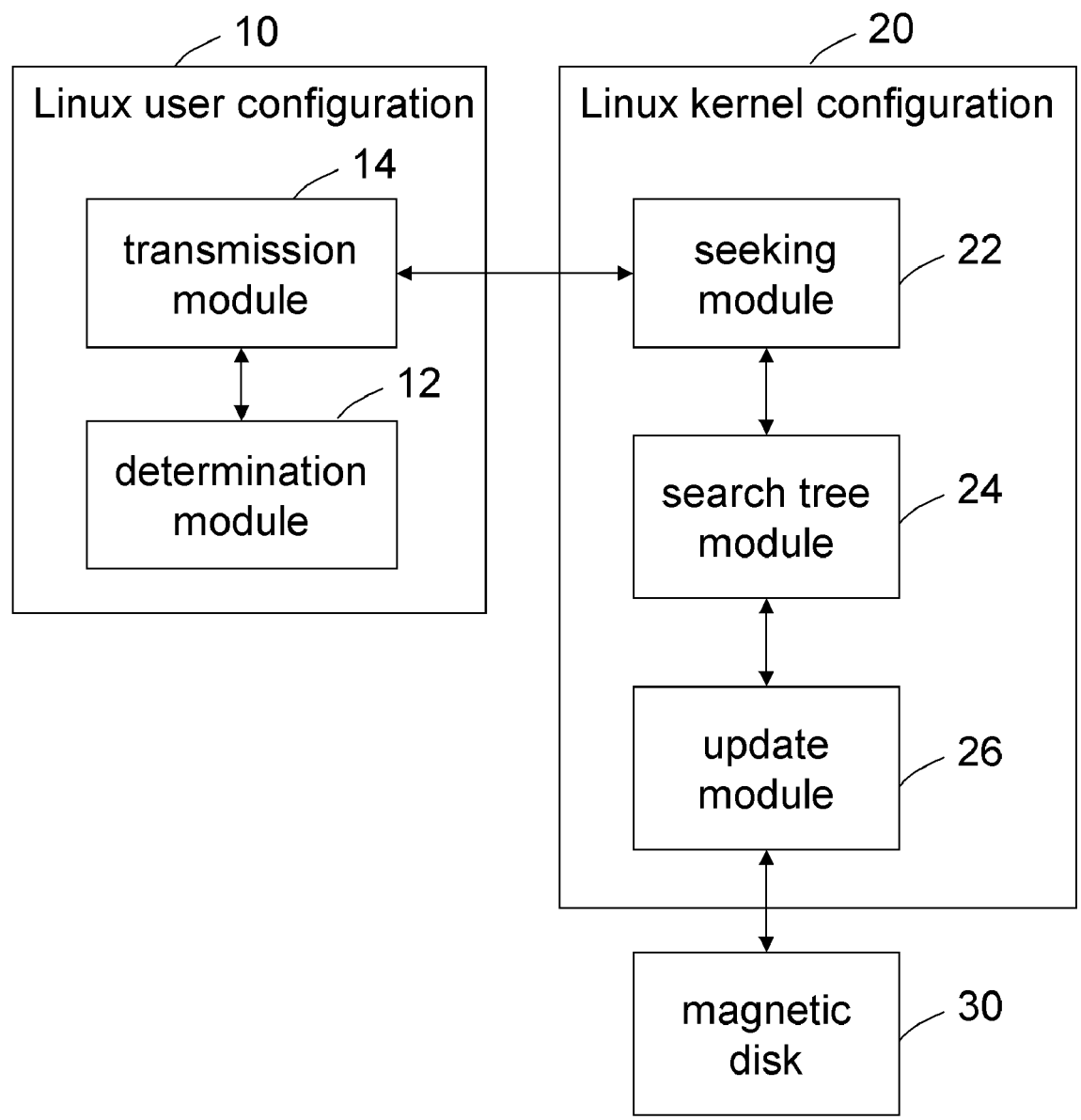
FIG. 1 is a system block diagram of system for updating dirty data of designated raw device according to an embodiment of the invention.

Refer to FIG. 1, showing a system for updating dirty data of designated raw device according to an embodiment of the invention. The system resides and is applied in a Linux system. The system includes a determination module 12, a transmission module 14, a seeking module 22, a search tree module 24, and an update module 26. The determination module 12 and the transmission module 14 are in a user configuration 10 of the Linux system. The seeking module 22, the search tree module 24, and the update module 26 is in a kernel configuration 20 of the Linux system.

In the following, the operation principle of the system for updating the dirty data of the designated raw device according to the embodiment of the invention will be described in detail together with FIG. 1.

In the user configuration 10, the determination module 12 is used to determine if a format of a command parameter for updating the dirty data of user designated raw device is correct. The determination module 12 first obtains for example a block device route, such as a command word of block_device_dirtypages_write, according to the command parameter for updating the dirty data of the designated raw device, hereby acquiring the primary and secondary device numbers. In case that the operation for obtaining the device number of the designated raw device fails, then it is determined that the number of the command parameter for updating the dirty data of the designated raw device is in error. In this case, the command parameter includes two parameters, namely, a device number and synchronous/asynchronous label. Wherein, the correct labeling expression for synchronous/asynchronous label is indicated by 0 or 1. Therefore, if the obtained value of the synchronous/asynchronous label in the command parameter is a value other than 0 or 1, then it indicates the format of a command parameter is in error, and that means that the designated raw device does not exist, hereby directly reporting an error message and exiting the process; otherwise, the transmission module 14 is used to transmit the command parameter for updating the dirty data of the designated raw device into the kernel configuration 20 of the Linux system in a system call manner, thus converting the primary and secondary device numbers in the user configuration 10 into device numbers in the kernel configuration 20.

In the kernel configuration 20, the system calls the command parameter for updating the dirty data of the designated raw device. In this process, the seeking module 22 mainly seeks a data structure of the designated raw device in the kernel configuration, and the corresponding function is called based on the transmitted command parameter. The seeking module 22 first travels through the data structure chain table of the block device in the kernel configuration, to obtain a device number of the raw device from the chain table, and then proceed with the comparison of the device number of the designated raw device with that of the corresponding raw device in the chain table. In case that the two device numbers are not matched, then it indicates that the designated raw device does not exist, thus the seeking module 22 directly returns, indicating that the designated device is not found. In case that the two device numbers match with each other, then the seeking module 22 transmits the sought result to a search tree module 24.

The search tree module 24 obtains a corresponding fast search tree through mapping of an address of the data structure of the sought raw device, and then finds the all the dirty data pages, i.e. the dirty data pages corresponding to the raw device, based on a position label of the buffer-stored fast search tree of the designated raw device. Finally, the update module 26 updates (writes) these dirty data pages into a magnetic disk 30 in a synchronous or asynchronous manner.

In implementing the update, the update module 26 achieves the update operation by calling a function of sync_blockdev_dirtypages according to the selected update manner. When updating the dirty data pages in the synchronous manner, the update module 26 will wait to conclude the process until all the dirty data have finished writing. When updating the dirty data pages in the asynchronous manner, the update module 26 makes use of kernel thread, such as a pdflush thread in executing function of sync_blockdev_dirtypages, hereby achieving dirty data update in the asynchronous manner.

Figure 2:
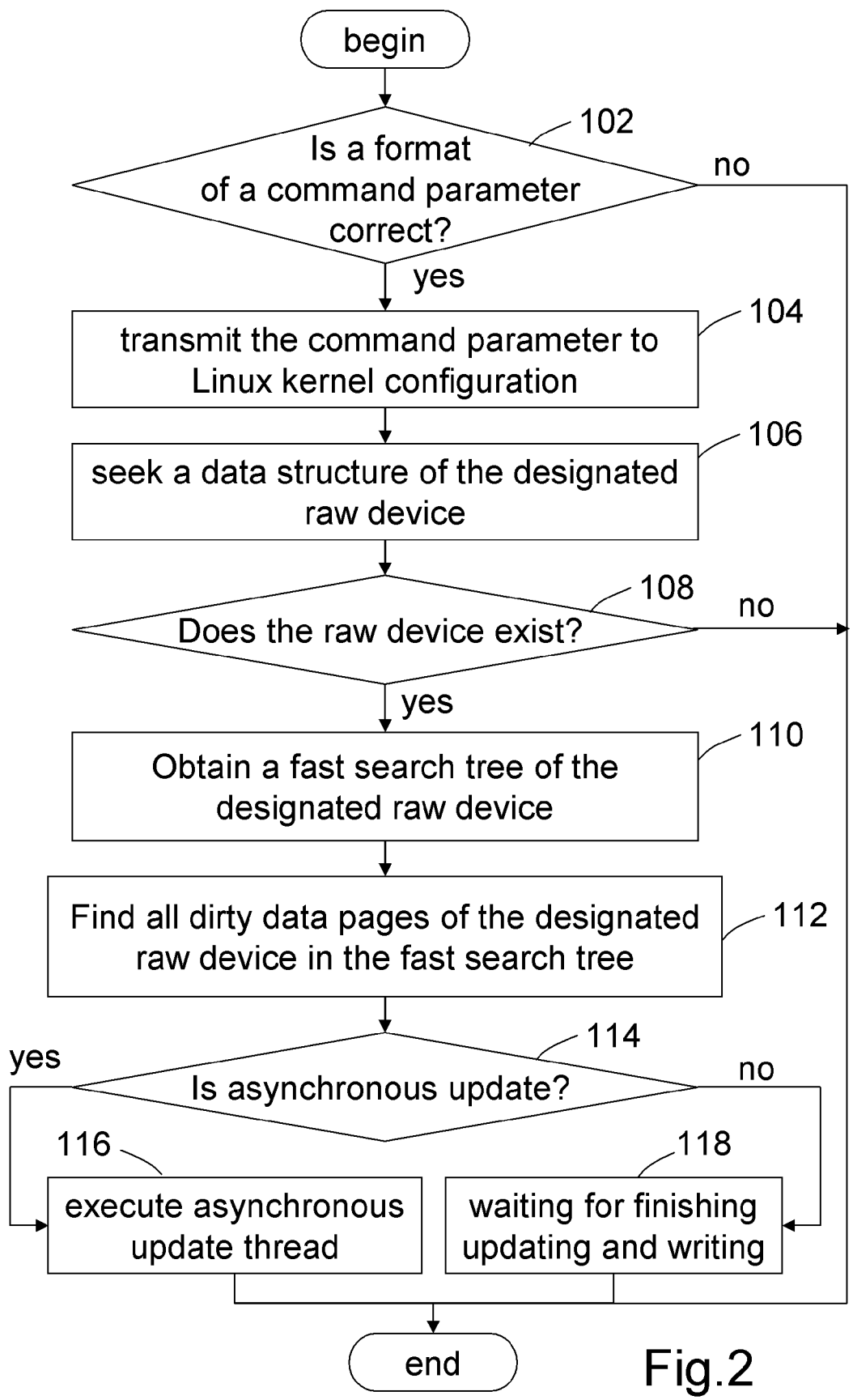
FIG. 2 is a system flowchart of the steps of a method for updating dirty data of designated raw device according to an embodiment of the invention.

Now, refer to FIG. 2 for a system flowchart of the steps of a method for updating dirty data of designated raw device according to an embodiment of the invention.

Firstly, in a user configuration, that, if a format of a command parameter for updating the dirty data of the user designated raw device is correct, is determined (step 102). Herein, a block device route, such as a command word of block_device_dirtypages_write, is obtained according to the command parameter for updating the dirty data of the designated raw device, to acquire the primary and secondary device numbers. In case that the operation for obtaining the device number of the designated raw device fails, such as the format of the command parameter for updating the dirty data of the user designated raw device is incorrect, then it indicates that the designated raw device does not exist, thus directly reporting the error and ending the process. However, in case that the format is correct, then the command parameter for updating the dirty data of the designated raw device is transmitted into the kernel configuration of the Linux system in a system call manner (step 104). In this case, the command parameter includes two parameters, namely, a device number and a synchronous/asynchronous label. Usually, the correct expression for the synchronous/asynchronous label is indicated by 0 or 1. Therefore, if the obtained value of the parameter is a value other than 0 or 1, then it indicates the format of the command parameter is in error.

When the command parameter is transmitted into the kernel configuration through the system call, the primary and secondary device numbers of the raw device in the user configuration must be converted into the device numbers in the kernel configuration.

In the kernel configuration, the system calls the command parameter for updating the dirty data of the designated raw device and seeks the data structure of the designated raw device (step 106). Then, the corresponding function is called based on the transmitted command parameter. When seeking the data structure of the designated raw device, firstly, a data structure chain table of the block device in the kernel configuration is traveled through to obtain a raw device in the chain table, and then the device number of the designated raw device is compared with that of the corresponding raw device in the chain table to determine if the designated raw device exists (step 108). When seeking the designated device, a plurality of designated raw devices can be sought according to a chain table.

In case that the device number does not match, that means that the designated raw device does not exist, then directly returns and terminates the process. Otherwise, a corresponding fast search tree is obtained through mapping an address of the data structure of the sought raw device in the above seeking process (step 110). Then, all the dirty data pages are found according to the position label of the buffer-stored designated raw device, namely, the dirty data pages corresponding to the raw device (step 112).

Subsequently, it is determined to perform synchronous update or asynchronous update for the designated raw device (step 114), and that is realized through determining if the synchronous/asynchronous label of the command parameter is 0 or 1. In case that the synchronous/asynchronous label is 0, then the synchronous update of the dirty data pages is adopted, hereby executing the sync_blockdev_dirtypages function until all the dirty data pages have finished updating and writing (step 118). Otherwise, in case that the synchronous/asynchronous label is 1, then a kernel thread is adopted, thus a pdflush thread is used to execute the sync_blockdev_dirtypages function, updating and writing the dirty data of the designated raw device of an open state into the magnetic disk in the asynchronous manner (step 116).

Through the application of the system and method of updating dirty data of designated raw device according to the invention, the dirty data of an individual raw device can be updated and written into the magnetic disk without interrupting the normal operation of the system, hereby ensuring a secure, convenient, and highly efficient update of the dirty data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system comprising a disk drive in a Linux operating system for updating dirty data of designated raw device on the disk drive on which one or more operations are performed, the system comprising:

a determination module, for determining the format of a command parameter through obtaining a first device number comprising a primary device number and a secondary device number of the designated raw device in a user configuration based on a device route of a command parameter for updating the dirty data of the designated raw device, wherein when the primary and secondary device numbers are obtained, the determination module determines that the format of the command parameter is correct;

a transmission module, for transmitting the command parameter to a Kernel of the Linux operating system in a system call manner when the format of the command parameter is correct, converting the primary and secondary device numbers of the command parameter of the designated raw device in the user configuration into a second device number in a kernel configuration;

a seeking module, for seeking a data structure of the designated raw device according to the first device number of the command parameter;

a search tree module, for getting a fast search tree of the designated raw device through mapping an address of the sought data structure, and finding all dirty data pages of the designated device from the fast search tree; and an update module, for updating all the dirty data pages to the disk drive in a synchronous or asynchronous manner.

2. The system for updating dirty data of designated raw device as claimed in claim 1, wherein when obtaining the first device number fails, the determination module determines that the format of the command parameter for updating dirty data of the designated raw device is incorrect.

3. The system for updating dirty data of designated raw device as claimed in claim 1, wherein the transmission module is used to convert the first device number of the designated raw device in the user configuration into the second device number in a kernel configuration, thus transmitting the command parameter to the Kernel of the Linux operating system.

4. The system for updating dirty data of designated raw device as claimed in claim 3, wherein the seeking module is used to compare the second device number of the designated raw device in the kernel configuration with that of raw device in a data structure chain table of the raw device in the Kernel of the Linux operating system, thus seeking a data structure of the designated raw device.

5. A method for updating dirty data of designated raw device on system comprising a magnetic disk drive in a Linux operating system on which one or more operations are performed, the method comprising:

(a) determining a format of a command parameter for updating the dirty data of the designated raw device through obtaining a first device number comprising a primary device number and a secondary device number of the designated raw device in a user configuration based on a device route of the command parameter, wherein when the primary and secondary device numbers are obtained, the determination module determines that the format of the command parameter is correct;

(b) when the format of the command parameter is correct, accessing a Kernel of the Linux operating system, including converting the primary and secondary device numbers of the first device number of the command parameter of the designated raw device in the user configuration into a second device number in a kernel configuration;

(c) seeking a data structure of the designated raw device according to the first device number of the command parameter;

(d) obtaining a fast search tree of the designated raw device through mapping an address of the sought data structure;

(e) finding all dirty data pages of the designated raw device from the fast search tree; and (f) updating the dirty data pages to the magnetic disk drive in a synchronous or asynchronous manner.

6. The method for updating dirty data of designated raw device as claimed in claim 5, wherein in the asynchronous manner, the step (f) is preformed by an asynchronous updating thread of the Kernel.

7. The method for updating dirty data of designated raw device as claimed in claim 5, wherein in the step (a), when obtaining the first device number fails, it is determined that the format of the command parameter for updating the dirty data of the designated raw device is incorrect; and further comprising reporting an error message when the format of the command parameter is incorrect.

8. The method for updating dirty data of designated raw device as claimed in claim 5, wherein the step (c) comprises:

traveling through a data structure chain table of the raw device in the Kernel;

comparing the second device number of the designated raw device in the kernel configuration with that of the raw device in the data structure chain table; and when the second device number and that of the raw device in the data structure chain table match, finding the data structure of the designated raw device.

* * * * *